(12) United States Patent
Miller et al.

(10) Patent No.: US 8,871,004 B2
(45) Date of Patent: Oct. 28, 2014

(54) METHODS FOR AGGLOMERATING ORES

(75) Inventors: Jan D. Miller, Salt Lake City, UT (US); Xuming Wang, Sandy, UT (US); Chen-Luh Lin, Salt Lake City, UT (US); Phanindra Kodali, West Jordan, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 57 days.

(21) Appl. No.: 13/388,231

(22) PCT Filed: Aug. 2, 2010

(86) PCT No.: PCT/US2010/044119
§ 371 (c)(1),
(2), (4) Date: Jan. 31, 2012

(87) PCT Pub. No.: WO2011/014873
PCT Pub. Date: Feb. 3, 2011

(65) Prior Publication Data
US 2012/0128554 A1 May 24, 2012

Related U.S. Application Data

(60) Provisional application No. 61/230,458, filed on Jul. 31, 2009.

(51) Int. Cl.
| C22B 1/14 | (2006.01) |
| C22B 1/243 | (2006.01) |
| C21B 3/02 | (2006.01) |
| C21B 5/02 | (2006.01) |
| C21B 7/06 | (2006.01) |
| C21C 5/02 | (2006.01) |
| C21C 7/04 | (2006.01) |
| C22B 7/04 | (2006.01) |
| C22B 9/10 | (2006.01) |
| C22C 1/06 | (2006.01) |
| C05B 19/00 | (2006.01) |
| C22B 1/242 | (2006.01) |
| C22B 3/18 | (2006.01) |
| C22B 3/04 | (2006.01) |

(52) U.S. Cl.
CPC . *C22B 1/242* (2013.01); *C22B 3/18* (2013.01); *C22B 3/04* (2013.01)
USPC .......... 75/770; 75/773; 75/326; 75/313; 23/313 R

(58) Field of Classification Search
CPC ....... C04B 14/365; C01F 11/46; C09C 1/025; C22B 1/14; C22B 1/243; C22B 3/045
See application file for complete search history.

(56) References Cited

U.S. PATENT DOCUMENTS 3,653,826 A 4/1972 Ishihara et al.
4,961,777 A * 10/1990 Perez et al. ............. 75/313

(Continued)

FOREIGN PATENT DOCUMENTS

WO WO 2011/014873 2/2011

OTHER PUBLICATIONS

Dresher, William. "Producing Copper Nature's Way: Bioleaching". Copper Development Association Inc. May 2004 [Retrieved on Sep. 18, 2013]. Retrieved from http://www.copper.org/publications/newsletters/innovations/2004/05/producing_copper_natures_way_bioleaching.html.*

(Continued)

*Primary Examiner* — Kaj K Olsen
*Assistant Examiner* — Karam Hijji
(74) *Attorney, Agent, or Firm* — Michael Best & Friedrich LLP

(57) ABSTRACT

A method for making an agglomerate of an ore is disclosed. The method comprises contacting the ore with an acid solution and a stucco binder. The stucco binder may include calcium sulfate hemihydrate. The ore agglomerate may include ore, acid solution, and stucco-derived gypsum.

16 Claims, 6 Drawing Sheets

(56) References Cited

U.S. PATENT DOCUMENTS 5,116,417 A 5/1992 Walker, Jr. et al.
6,926,753 B2 * 8/2005 Faine et al. .................. 75/712

OTHER PUBLICATIONS

Malisch, Ward. Polypropylene Fibers in Concrete. Concrete Construction. Apr. 1986 [Retrieved on Sep. 17, 2013]. Retrieved from http://www.concreteconstruction.net/concrete-articles/polypropylene-fibers-in-concrete.aspx.*

Kodali, Phanindra; Depci, Tolga; Dhawan, Nikhil; Wang, Xuming; Lin, C.L.; Miller, Jan D. "Evaluation of stucco binder for agglomeration in the heap leaching of copper ore". 2013. Retrieved from http://content.lib.utah.edu/utils/getfile/collection/uspace/id/5459/filename/5469.pdf.*

International Search Report and Written Opinion for Application No. PCT/US2010/44119 dated Sep. 20, 2010 (7 pages).

Lewandowski, K.A., Kawatra, S.K., "Development of experimental procedures to analyze copper agglomerate stability," Minerals and Metallurgical Processing Journal, (25) 110-116 (2008).

Sylvie C. Bouffard, "Review of agglomeration practice and fundamentals in heap leaching," Mineral Processing & Extractive Metallurgy Review (26) 233-294 (2005).

* cited by examiner

METHODS FOR AGGLOMERATING ORES

CROSS-REFERENCE TO RELATED APPLICATIONS

This application is a national stage filing under 35 U.S.C. 371 of International Application No. PCT/US2010/044119, filed on Aug. 2, 2010, which claims the benefit of U.S. Provisional Application No. 61/230,458, filed Jul. 31, 2009, the contents of which is are incorporated herein by reference in the entireties.

INTRODUCTION

Metals and other valuable components can be recovered from low-grade ores by heap leaching. For heap leaching, ore is stacked in large piles ("lifts") with heavy equipment in a large area that is lined for solution containment (leach pad). Each lift may be 20' high or higher. The leach pad may be 100 acres or larger. A leach solution known to solubilize the minerals in the ore is sprayed on the surface of the heaps on the leach pad. As the leach solution percolates through the heap, the minerals are solubilized, and thus flow away from the heap along with the solution. After flowing through the heap, the leach solution is recovered in a collection pond. Generally, the solubilized minerals are later recovered from the solution via chemical precipitation or electrochemical deposition, among other methods. In other instances, the leach solution itself may have valuable properties, for example, as a fertilizer.

DETAILED DESCRIPTION

Figure 1:
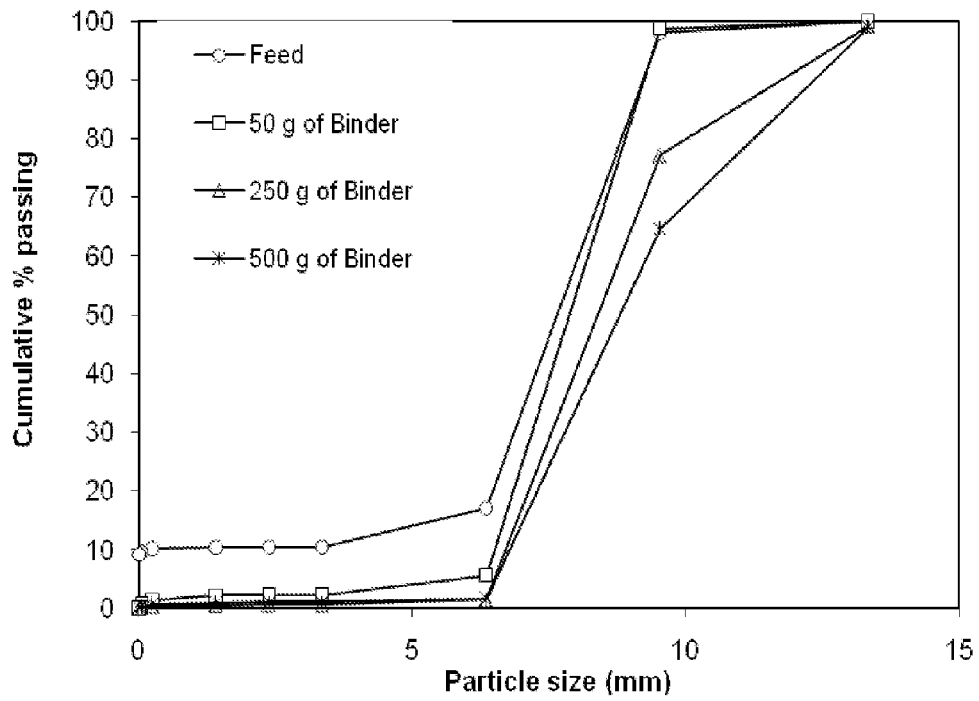
FIG. 1 is a graph comparing particle size distributions of agglomerates formed with varying amounts of stucco.

The present disclosure is not limited in its application to the specific details of construction, arrangement of components, or method steps set forth herein. The compositions and methods disclosed herein are capable of being made, practiced, used, carried out and/or formed in various ways. The phraseology and terminology used herein is for the purpose of description only and should not be regarded as limiting. Ordinal indicators, such as first, second, and third, as used in the description and the claims to refer to various structures or method steps, are not meant to be construed to indicate any specific structures or steps, or any particular order or configuration to such structures or steps. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification, and no structures shown in the drawings, should be construed as indicating that any non-claimed element is essential to the practice of the invention. The use of "including," "comprising," or "having" and variations thereof herein is meant to encompass the items listed thereafter and equivalents thereof, as well as additional items. Unless specified or limited otherwise, the terms "mounted," "connected," "supported," and "coupled" and variations thereof encompass both direct and indirect mountings, connections, supports, and couplings. Further, "connected" and "coupled" are not restricted to physical or mechanical connections or couplings.

Recitation of ranges of values herein are merely intended to serve as a shorthand method of referring individually to each separate value falling within the range, unless otherwise indicated herein, and each separate value is incorporated into the specification as if it were individually recited herein. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this application. Use of the word "about" to describe a particular recited amount or range of amounts is meant to indicate that values very near to the recited amount are included in that amount, such as values that could or naturally would be accounted for due to manufacturing tolerances, instrument and human error in forming measurements, and the like.

No admission is made that any reference, including any non-patent or patent document cited in this specification, constitutes prior art. In particular, it will be understood that, unless otherwise stated, reference to any document herein does not constitute an admission that any of these documents forms part of the common general knowledge in the art in the United States or in any other country. Any discussion of the references states what their authors assert, and the applicant reserves the right to challenge the accuracy and pertinency of any of the documents cited herein.

Heap leaching is a method used to recover metals from low grade ores. In copper heap leaching, for example, ore is stacked in approximately 20 ft "lifts" (heaps) on a heap leach pad, and an acidic leach solution (a.k.a. raffinate) is sprayed on the heaps. As the leach solution percolates through the heap, the copper is solubilized and retained in the leach solution, typically known as a pregnant leach solution (PLS). The PLS is recovered in a collection pond (the PLS pond), and then the copper is recovered from the PLS by causing the copper to leave the PLS. Metals may be recovered from the PLS with a number of techniques, including, but not limited to, precipitation and electrowinning.

In addition to pulling solubilized minerals through the heap, the percolating leach solution also causes migration of fine particles (fines). The migration of fines can clog the natural flow channels through the heap by forming impermeable barrier layers within the heap. These layers can act as a "roof," protecting an underlying section of the heap from the percolating leach solution. When this happens, the protected sections are only partially leached, or not leached at all, which lowers the overall recovery of minerals from the ore.

To overcome the problem of fines migration and barrier layer formation, the ore may be agglomerated prior to heap leaching. Water agglomeration causes the smaller particles to adhere to coarser ore particles via capillary adhesion, thereby diminishing the migration of fines and the formation of barriers within the leach heaps. The smaller particles may be smaller than about 1 mm, typically smaller than about 100 µm, and more typically smaller than about 10 µm. Agglomeration is especially important when the fines (e.g., −200 mesh) amount to greater than about 5% of the particles in a heap leach pad.

High-quality agglomerates are strong, porous, and able to be stacked to allow the flow of leach solution. High-quality agglomerates may be between about 0.5" and about 2" in size, with an optimal distribution of sizes favoring larger sizes over smaller sizes. While the quality of agglomerates can be evaluated visually, it is instructive to evaluate the agglomerates by other procedures (i.e., tests or experiments), including electrical conductivity, agglomerate size distribution, permeability and soak tests. Electrical conductivity measurements are indicative of the internal water content. Agglomerates can be characterized by their size distribution. Permeability tests are indicative of solution flow rate through a bed of agglomerates. Finally, soak tests can be used to determine weight when agglomerates are soaked, and are indicative of the loss of fines reflecting the relative mobility of fines in a heap.

Ores may be agglomerated by passing them through revolving drums prior to forming a heap. Inside the revolving drum, the ore may be tumbled with water, raffinate, acid solution, or a combination thereof, at a level of about 10% solution by weight based on the total mix of ore, solution, and binder. The acidity of the solution may be adjusted, depending upon the grade and mineralogical composition of the ore. The intermixing of the solution and ore may solubilize the easily leached metals while causing the fine mineral particles to stick to large particle surfaces. In some cases, the agglomerate may be short lived. Over time, as the heap is leached, the fines may separate from the larger particles.

The weak force of adhesion between the leach solution and ore particles may be strengthened with the use of binders during agglomeration. Binders are additional compounds that may create more permanent adhesion between the large particles and the fines. Binders may be selected to be economical and to be compatible with the agglomeration steps. Binders that withstand repeated exposure to acid solutions percolated through a heap may be more effective than binders that do not withstand repeated exposure to acid solutions. Examples of binders include, but are not limited to lignin, cellulose, tall oil, and sodium silicate. See, e.g., Lewandowski, K. A., Kawatra, S. K., "Development of experimental procedures to analyze copper agglomerate stability," *Minerals and Metallurgical Processing Journal*, (25) 110-116 (2008), the entire disclosure of which is herein incorporated by reference for all purposes. These binders may, in some cases, be ineffective due to their reactivity with acid leach solutions. As such, there exists a need for other binders that may form more stable agglomerates in acidic solutions.

Acid heap leaching is commonly used to extract metals from low-grade ores. It is expected that acid heap leaching will become more prevalent as fields containing richer ores are exhausted, and mining industries increasingly turn to low-grade sources. Metals recovered with acid heap leaching may include, but are not limited to, copper, nickel, uranium, and zinc, and combinations thereof.

Acid heap leaching is also used to extract other valuable components, such as phosphate, from ores containing such components. In one embodiment, phosphate ores, such as those containing calcium phosphate are heaped and leached with sulfuric acid in order to recover the phosphate. In some cases, phosphate salts may be recovered from the acid solution after the acid solution has percolated through the phosphate ore, however, in other cases, the phosphate-containing solution may be cleaned and used directly.

The present disclosure provides a method for agglomerating ores by combining the ores with acid solution and stucco, and also provides agglomerates comprising acid solution, stucco, and ore. By adding stucco along with an acid solution, high-quality agglomerates are formed which have a suitable water content and high permeability to fluid flow through a packed heap of agglomerates. In some embodiments, the agglomerates have an acid solution content of between about 8% and about 10%. Such agglomerates substantially decrease the migration of fines, while inhibiting the formation of barriers within the leached ore, resulting in higher rates of metal recovery and fewer problems with plugging of leach solution transfer equipment, e.g., pumps. Suitable agglomerates typically have an electrical conductivity of between about 0.002 and about 0.004 $\Omega^{-1}$ cm$^{-1}$. The size of the agglomerates, as well as the distribution of agglomerate size may vary with ore type and crushing circuit design.

In some embodiments, the agglomerate may be formed by mixing an ore with a stucco binder and an acid solution. The stucco binder of the invention may comprise calcium sulfate hemihydrate ($CaSO_4 \cdot \frac{1}{2}H_2O$). Additional modifiers also may be added. Calcium sulfate hemihydrate reacts with water to form gypsum, ($CaSO_4 \cdot 2H_2O$) via the reaction $CaSO_4 \cdot \frac{1}{2}H_2O + 3/2\ H_2O \rightarrow CaSO_4 \cdot 2H_2O$. In this regard, stucco may function as an effective binder, because the stucco hydration reaction, which occurs during agglomeration of the ore, immobilizes the fines by binding them together with coarser ore particles via the gypsum hydration product which forms in-situ and serves to stabilize the agglomerates thus formed. Because gypsum is formed in the presence of the ore, the resulting agglomerates are much different from agglomerates formed merely by the inclusion of gypsum (see Example 7). That is, gypsum formed in-situ from stucco as a component of the agglomerates, is different and superior to gypsum added directly during agglomeration. In fact gypsum added directly during agglomeration is not effective as a binder for ore agglomeration.

The stucco binder may additionally comprise modifiers, including, but not limited to, binders, including, but not limited to, lignin, cellulose, tall oil, polymers, and sodium silicate; fibers, including, but not limited to, glass fibers and plastic fibers; and thickeners, including, but not limited to, cellulose-based thickeners, such as carboxymethylcellulose, carboxyethylcellulose, and salts thereof. The stucco binder may be mixed at between about 1% and about 10% (w/w) of agglomerate, and more typically between about 3% and about 5% (w/w) of agglomerate. The acid solution may comprise at least one of sulfuric acid, hydrochloric acid, nitric acid, among other acids. The acid solution may be mixed at between about 2% and about 15% (w/w) of agglomerate, and more typically at between about 7% and about 10% (w/w) of agglomerate. In some embodiments, acidophilic "heaping" bacterial, including, but not limited to, *Thiobacillus acidophilus, Sulfobacillus thermosulfidooxidans, Metallosphaera sedula*, and *Sulfolobus solfaraticus* may be added during the mixing. The mixing may be done in a rotating drum mixer, although other means of mixing, such as rotary mixers or paddle mixers, also may be used.

The stucco binder of the present disclosure may comprise calcium sulfate hemihydrate, such as that formed by calcination of gypsum (naturally or from flu gas desulphurization), and sold in commercial stucco formulations. However, because the stucco need not be of architectural quality, alternative sources of stucco are also suitable for the invention. For example, used wallboard (drywall) can be shredded and heat-treated to produce stucco that is suitable for use in the methods disclosed herein.

The quality/stability of the agglomerates is revealed from various evaluation tests, including particle size-distribution, water permeability, electrical conductivity and visual inspection. Suitable mixtures for the ore tested and the corresponding particle size distribution may contain between about 77% and about 97% ore; between about 2% and about 15% (w/w) acid solution, and more typically between about 7% and about 10% (w/w) acid solution; and between about 1% and about 8% (w/w) stucco, and more typically between about 3% and about 5% (w/w) stucco. The formulations for high-quality agglomerates may change with the type and particle size distribution of the ore.

EXAMPLES

Example 1

Agglomerate Formation

A plastic drum mixer that rotates at 20 RPM and with a 5 degree inclination was used for agglomeration experiments. The raw material for each agglomeration experiment was 20 pounds of coarse copper ore (½ inch×3 mesh; typically 5 mm nodules or larger) and 2 pounds of fine ore (−200 mesh; typically smaller than 100 μm). The copper ore and stucco (calcium sulfate hemihydrate, were mixed in the drum for one minute. To this mixture, water and a 20% (w/w) sulfuric acid solution were added in the drum, and the material was mixed for three minutes to create agglomerates. Water, acid and stucco amounts were varied as described in Table 1. (The formulations correspond to 80 kg/ton water and 20 kg/ton acid, which are standard agglomerate mixtures for low-grade copper ore agglomeration. See, Sylvie C. Bouffard, "Review of agglomeration practice and fundamentals in heap leaching," *Mineral Processing & Extractive Metallurgy Review* (26) 233-294 (2005), the entire disclosure of which is herein incorporated by reference for all purposes.

TABLE 1

Agglomerate mixtures tested for wet permeability and fines release.

| Formulation Number | Stucco (g) | Ore Fines (g) | Total Fines (g) | Modifier (% of stucco) % | Water (g) | Acid (g) |
|---|---|---|---|---|---|---|
| 1A | 0 | 1407 | 1407 | 0 | 800 | 200 |
| 2A | 0 | 907 | 907 | 0 | 800 | 200 |
| 3A | 50 | 907 | 957 | 2% | 800 | 200 |
| 4A | 100 | 907 | 1007 | 2% | 800 | 200 |
| 5A | 250 | 907 | 1157 | 2% | 800 | 200 |
| 6A | 500 | 907 | 1407 | 2% | 800 | 200 |
| 7A | 500 | 907 | 1407 | 6% | 800 | 200 |
| 8A | 500 | 907 | 1407 | 2% | 1600 | 200 |
| 9A | 500 | 907 | 1407 | 2% | 1000 | 200 |

A portion of each agglomerate mixture was dried at 35° C. for one day. Then 500 grams of each dried agglomerate mixture was sieved to determine the size distribution of particles formed. Before sieving, each sieve was cleaned and the tare weight of each sieve was recorded. The sieves were then assembled in a column. The sieve with the largest opening size was at the top, the sieve with the next smaller opening size below that, and so on, with the sieve with the smallest opening size at the bottom. Once the sieves were assembled, the dried agglomerate was placed on the top screen, and all the sieves were shaken in a sieve shaker for three minutes. When the shaking was complete, each sieve was weighed again and the mass for each size class was obtained by subtracting the weight of the sieve containing with the agglomerate material from the tare weight recorded previously.

FIG. 1 compares the particle size distribution for non-agglomerated feed to formulations 3A, 5A and 6A of Table 1. The particle size distribution of the various formulations shows that agglomerates become coarser as the amount of binder used to form the agglomerates is increased. From the results plotted in FIG. 1, it is evident that agglomerates formed with 250 g and 500 g of stucco are markedly coarser than the other agglomerated samples.

Example 2

Soak Loss

A 500 g sample of each dried agglomerated formulation from Table 1 was placed on a clean 10 mesh sieve, weighed, and soaked in 6 gpl sulfuric acid solution for ten minutes. The samples were then dried in an oven at 35° C. for one day. Weight loss via metal solubilization or fines release was calculated by subtracting the post-soak dry weight of each sample from the pre-soak weight. The results are given in Table 2. From Table 2, it is clear that weight loss due to soaking of agglomerates decreased from 13.6% when no stucco was added to 8.9% when 200 g of stucco was added.

TABLE 2

Soak loss for agglomerate formulations.

| Formulation Number | Before Soaking W1 (g) | After Soaking W2 (g) | Weight Loss (g) | Total Weight Loss % |
|---|---|---|---|---|
| 1A | 500.41 | 431.96 | 68.45 | 13.6 |
| 2A | 500.13 | 462.95 | 37.18 | 7.43 |
| 3A | 501.30 | 460.45 | 40.85 | 8.14 |
| 4A | 500.80 | 457.30 | 43.50 | 8.6 |
| 5A | 501.83 | 457.14 | 44.69 | 8.9 |
| 6A | 500.50 | 446.05 | 54.45 | 10.8 |
| 7A | 500.50 | 442.98 | 57.52 | 11.49 |
| 8A | 500.174 | 450.53 | 49.64 | 9.92 |
| 9A | 501 | 444.28 | 56.72 | 11.32 |

Example 3

Wet Permeability

The coefficient of permeability of agglomerate samples from Table 1 was measured in a permeameter using the ASTM D 2434D "Standard Test Method for Permeability of Granular Soils" Test. A cylindrical permeameter column of about four inch diameter and seven inch in length was designed to hold the sample of agglomerates fitted between two perforated plates (about 3 mm diameter holes). Marbles are placed at the bottom and top of the agglomerate in the column to help maintain the agglomerate bed and sustain uniform flow. A constant head of water was kept on the inlet and the outlet of the sample so the head difference was constant during the experiment. Experiments were run at different head differences but being careful to maintain laminar flow conditions. The volume of water was collected and the flow rate was measured during these permeability experiments.

Figure 2:
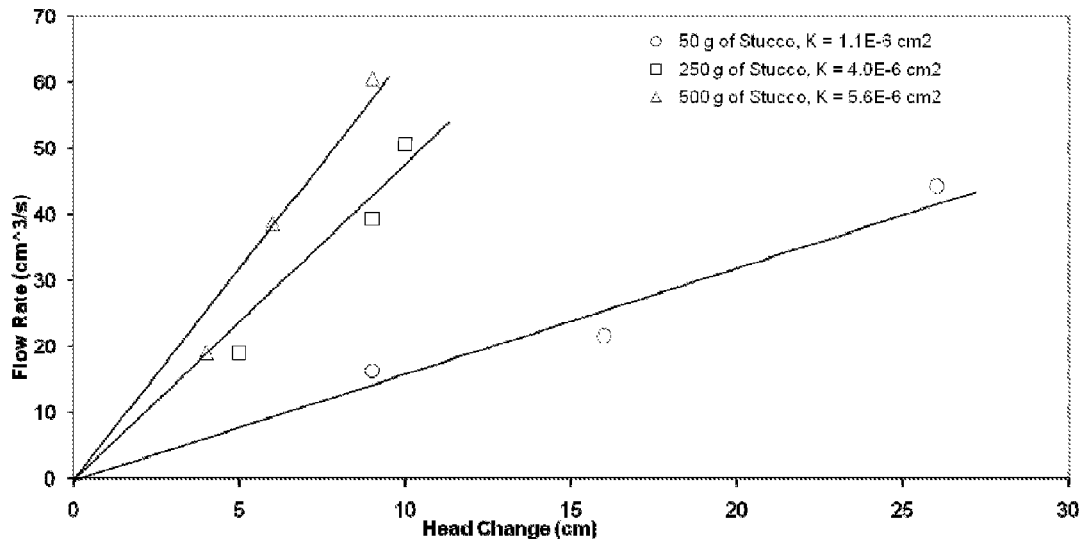
FIG. 2 is a graph comparing permeability data for agglomerates formed with varying amounts of stucco.

The flow was driven with different hydraulic gradients. As shown in FIG. 2, a line could be fitted for the different flow rate vs. hydraulic gradient data. The coefficient of permeability was calculated from the slope of the line.

$$Q=(K*A*h)/L$$

$$\text{Slope}=(K*A)/L$$

Where,
L=Length of the sample in permeameter=7 inch
h=Hydraulic head difference across length L, in cm of water
Q=Discharge ml/sec
A=Area of cross section of the specimen
K=Coefficient of permeability, cm/sec The permeability of agglomerates increased from 1.1E-6 cm2 to 5.6E-6 cm2 as the stucco amount is increased from 50 g to 500 g, as illustrated by the increase in the slope of the lines shown in FIG. 2.

Example 4

Electrical Conductivity

Figure 3:
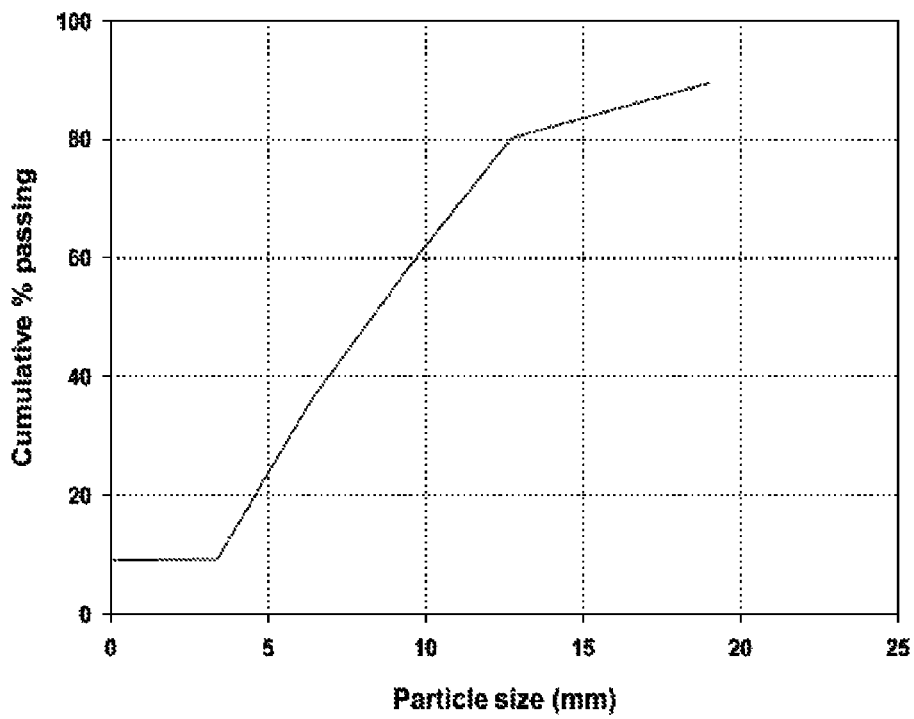
FIG. 3 is a graph showing the distribution of particle sizes of an ore used to prepare various agglomerates.

Agglomerates were prepared as described in Table 3, using copper ore (feed) having the particle-size distribution shown in FIG. 3. A sample of each agglomerate in the wet state formulation was placed in a device that holds the sample between two stainless steel electrodes that are connected to a multi-meter. Measuring the resistance R (Ω) of each sample, with the multi-meter, it is possible to calculate the electrical conductivity, K, of the packed agglomerate bed using K=L/RA, wherein K is the conductivity (1/Ω cm), L is distance between the plates (cm), and A is the cross sectional area of packed agglomerate bed (cm$^2$). Electrical conductivity values are directly proportional to amount of moisture present in the sample.

TABLE 3

Formulations 1B-10B and measured electrical conductivity

| Formulation | Binder Type | Binder Amount (g) | Weight % of Binder | Sulfuric Acid Solution (g) | Weight % of Sulfuric Acid Solution | Electrical Conductivity 1/(ohm cm) |
|---|---|---|---|---|---|---|
| 1B | Stucco | 0 | 0.00 | 500 | 5.22 | 0.0019 |
| 2B | Stucco | 0 | 0.00 | 1000 | 9.93 | 0.0058 |
| 3B | Stucco | 100 | 1.03 | 500 | 5.17 | 0.0017 |
| 4B | Stucco | 100 | 0.98 | 1000 | 9.83 | 0.0046 |
| 5B | Stucco | 350 | 3.53 | 500 | 5.04 | 0.0006 |
| 6B | Stucco | 350 | 3.36 | 1000 | 9.60 | 0.0036 |
| 7B | Stucco | 1000 | 9.46 | 500 | 4.73 | 0.0003 |
| 8B | Stucco | 0 | 0.00 | 2000 | 18.06 | 0.0063 |
| 9B | Stucco | 450 | 4.28 | 1000 | 9.50 | 0.0027 |
| 10B | Stucco | 350 | 3.44 | 750 | 7.37 | 0.0020 |

Figure 4:
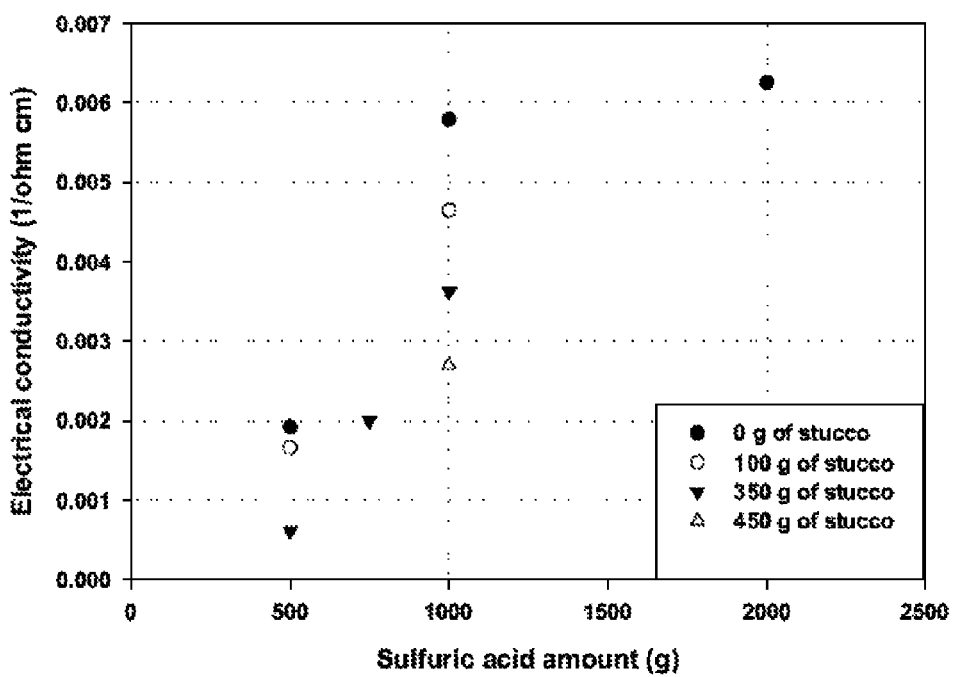
FIG. 4 is a graph comparing the effect of sulfuric acid on the electrical conductivity of various agglomerates.

FIG. 4 graphically shows data from Table 3. FIG. 4 shows that an increase in sulfuric acid content initially causes an increase in electrical conductivity until the electrical conductivity levels off at higher sulfuric acid concentrations. FIG. 4 also shows that an increase in binder content causes an increase in electrical conductivity when sulfuric acid content is held constant.

Example 5

Visual Inspection

Figure 5:
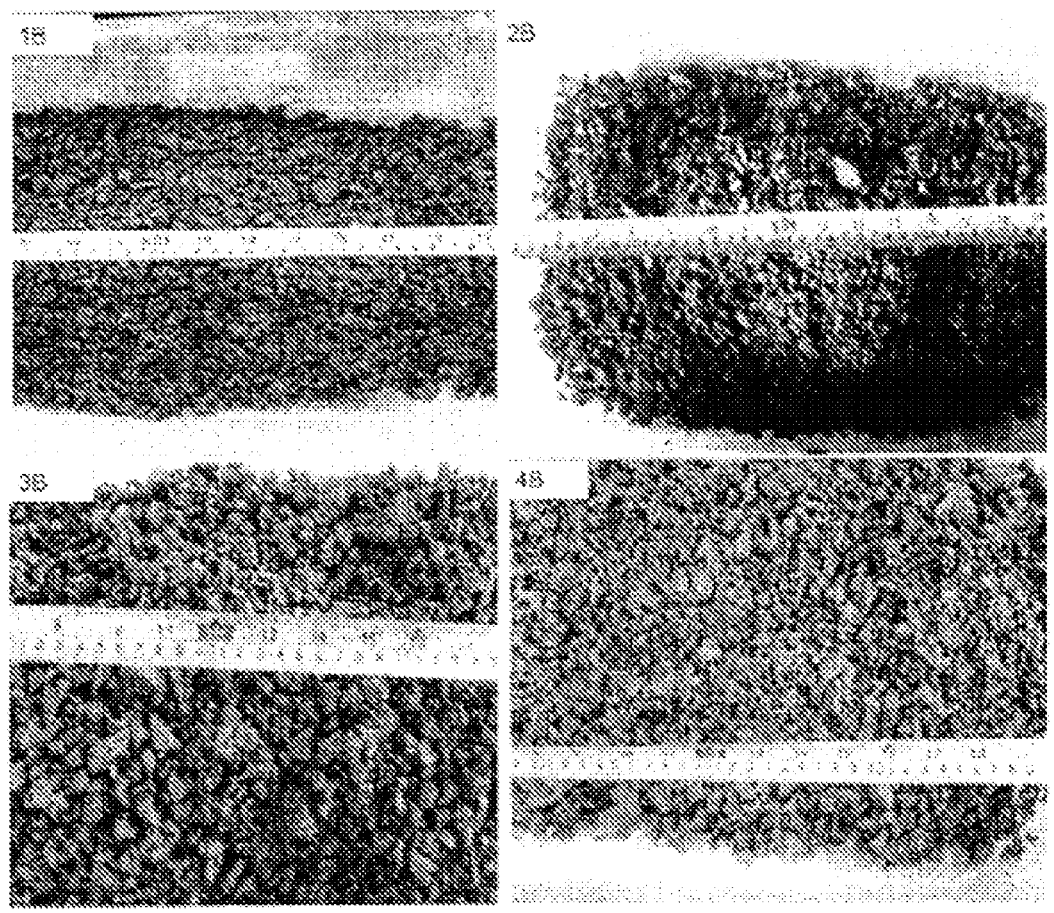
FIG. 5 is a series of photographs showing various agglomerates.
Figure 6:
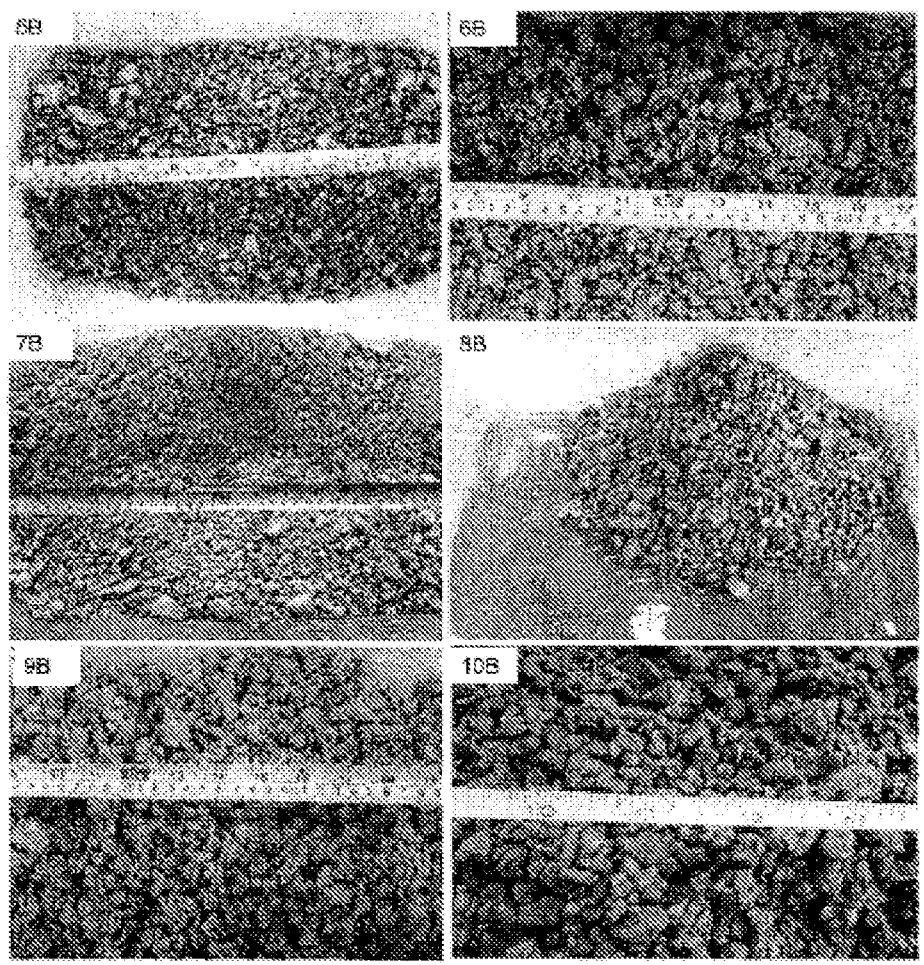
FIG. 6 is a series of photographs showing various agglomerates.

The agglomerate formulations in Table 3 were evaluated visually for average agglomerate size, size distribution, and wetness. Photographs corresponding to each formulation are shown in FIGS. 5 (1B-4B) and 6 (5B-10B). The results of the evaluation are shown in Table 4.

TABLE 4

Visual inspection of agglomerates

| Formulation | Binder Type | Binder Amount (g) | Weight % of Binder | Sulfuric Acid Solution (g) | Weight % of Sulfuric Acid Solution | Quality of Agglomerates as Determined by Visual inspection |
|---|---|---|---|---|---|---|
| 1B | Stucco | 0 | 0.00 | 500 | 5.22 | wet |
| 2B | Stucco | 0 | 0.00 | 1000 | 9.93 | too wet |
| 3B | Stucco | 100 | 1.03 | 500 | 5.17 | low wet |
| 4B | Stucco | 100 | 0.98 | 1000 | 9.83 | less wet than experiment 2 |
| 5B | Stucco | 350 | 3.53 | 500 | 5.04 | low dry |
| 6B | Stucco | 350 | 3.36 | 1000 | 9.60 | ideal agglomerate |
| 7B | Stucco | 1000 | 9.46 | 500 | 4.73 | driest |
| 8B | Stucco | 0 | 0.00 | 2000 | 18.06 | wettest |
| 9B | Stucco | 450 | 4.28 | 1000 | 9.50 | ideal agglomerate |
| 10B | Stucco | 350 | 3.44 | 750 | 7.37 | ok, but not as good as 6B |

Visual evaluation indicated that the best agglomerates resulted from formulations having 350 g of stucco and 1000 g of acid solution (Formulation 6B), 450 g of stucco and 1000 g of acid solution (Formulation 9B), and 350 g of stucco and 750 g of acid solution (Formulation 10B). Agglomerates having 0 g of stucco and either 500 g or 1000 g of acid solution (Formulations 1B and 2B, respectively) and having 100 g of stucco and either 500 g or 1000 g of acid solution (Formulations 3B and 4B, respectively) were wet. Agglomerates having 350 g of stucco and 500 g of acid solution (Formulation 5B) and 1000 g of stucco and 500 g of acid solution (Formulation 7B) were dry. Finally, the agglomerate having 0 g of stucco and 2000 g of acid solution was too wet.

Moreover, because of the distinct difference in reflected light between high- and low-quality agglomerates, it is expected that the quality could be assessed with reflectivity measurements, e.g., by measuring reflected light with a photodiode.

Figure 7:
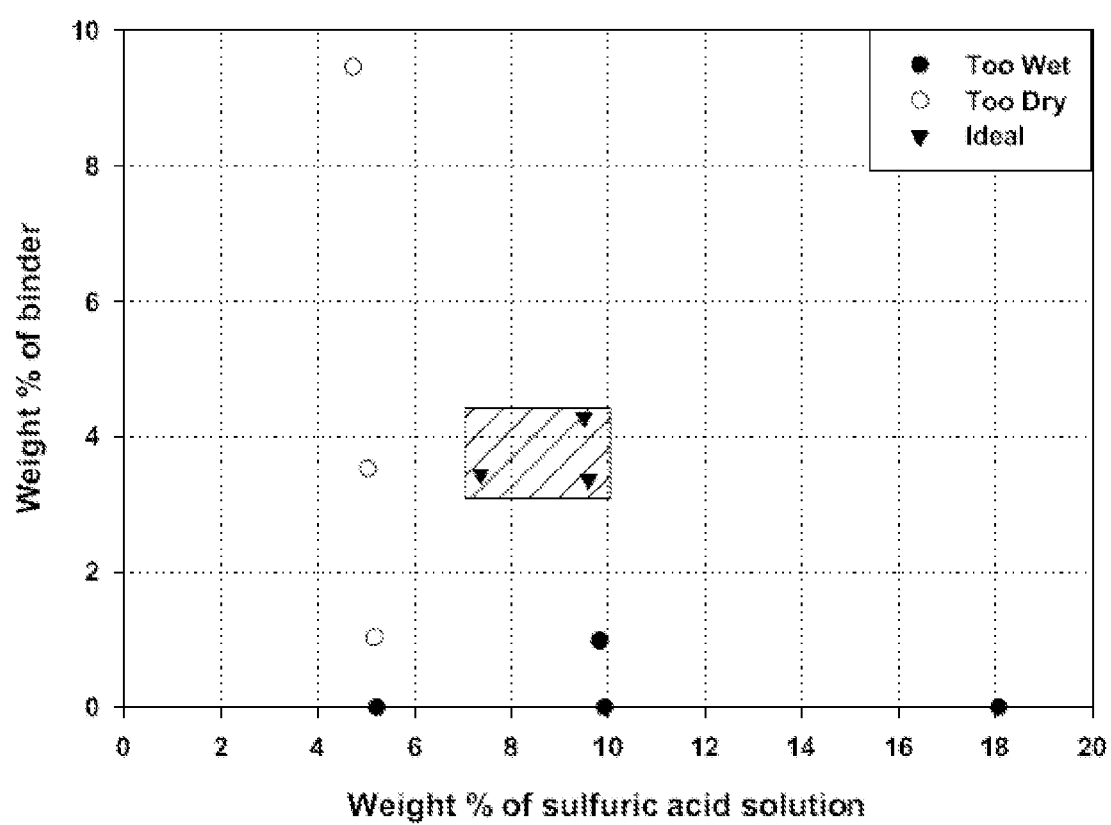
FIG. 7 is a graph showing the correlation between binder composition, acid composition, and agglomerate quality.

Perhaps the best representation of the results from these agglomerate experiments is shown in FIG. 7, where a phase diagram reveals the nature of agglomerates with respect to agglomerate quality. In FIG. 7, the data is based on a judgment of the agglomerates quality from visual inspection. As shown by the hatched area of FIG. 7, the highest-quality agglomerates result from mixtures having between about 3% and about 5% (w/w) stucco and between about 7% and about 10% (w/w) acid solution (80% water and 20% sulfuric acid by volume). See also FIG. 1, which shows more favorable particle size distributions for formulations having stucco compositions of about 5% (w/w) stucco.

Example 6

Effect of Water on Agglomerate Quality

Figure 8:
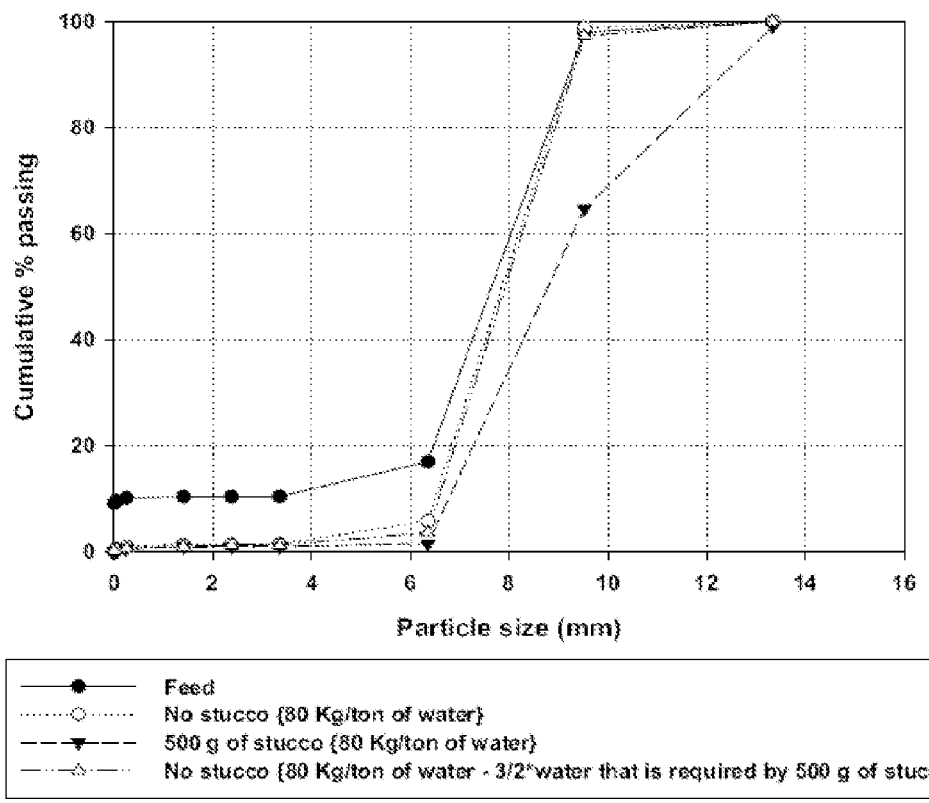
FIG. 8 is a graph comparing particle size distributions of agglomerates formed with and without stucco at selected water contents.

Additional experiments were performed to determine if agglomerate quality was simply a function of agglomerate water content. Agglomeration experiments were conducted with 0 g stucco and by serially decreasing the water content from 80 kg/ton of water. If agglomerate quality was merely a function of water content, the best agglomerates should be observed when the water content was 80 kg/ton of water minus the amount of water needed to convert 500 g stucco into gypsum via $CaSO_4 \cdot \frac{1}{2}H_2O + 3/2\ H_2O \rightarrow CaSO_4 \cdot 2H_2O$. FIG. 8 is a graph comparing particle size distributions of agglomerates formed with and without stucco at selected water contents. As can be seen in FIG. 8, without stucco, the "optimum" water content agglomerates were no better than those with 80 kg/ton of water. As can been seen in FIG. 8, agglomerates having no stucco and 80 kg water/ton of ore (open circles-too wet) have nearly identical particle size distributions as agglomerates having no stucco and the "optimum" water content (open triangles-too dry).

Example 7

Comparison to Gypsum Binder

Stucco (calcium sulfate hemihydrate) converts to gypsum (calcium sulfate dehydrate) in the presence of water according to $CaSO_4 \cdot \frac{1}{2}H_2O + 3/2\ H_2O \rightarrow CaSO_4 \cdot 2H_2O$. To verify that stucco, and not gypsum, is responsible for the improved agglomerates, stucco-binder agglomerates and gypsum-binder agglomerates were compared. Both stucco and gypsum were added in separate experiments to an ore mixture at concentrations of 350 g of binder and 1000 g of sulfuric acid solution. These formulations corresponded to experiment 6B, the conditions under which ideal agglomerates were obtained using stucco binder. In order to maintain the same amount of solution, the water in the gypsum binder formulations was reduced according to the reaction stoichiometry.

Figure 9:
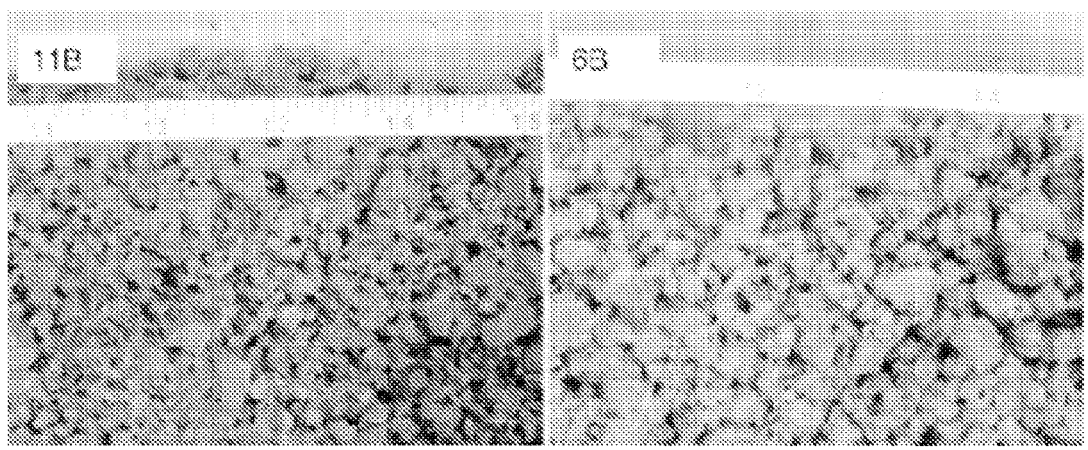
FIG. 9 is a pair of photographs showing different agglomerates.

FIG. 9 compares photographs of formulations using gypsum (11B) and stucco (6B) binders side by side. Table 5 compares the physical properties of the agglomerates. From the electrical conductivity values and visual inspection, it is clear that the gypsum binder does not produce good quality agglomerates. In particular, the higher electrical conductivity value for agglomerates with the gypsum binder suggests that the agglomerates are too wet. This observation is consistent with visual comparison of the agglomerates. See FIG. 9.

TABLE 5

Evaluation of agglomerates based on visual inspection and electrical conductivity results for agglomerates produced by using gypsum and stucco binders respectively.

| Formulation | Binder Type | Binder Amount (g) | Weight % of Binder | Sulfuric Acid Solution (g) | Weight % of Sulfuric Acid Solution | Quality of Agglomerates as Determined by Visual Inspection | Electrical Conductivity 1/(ohm cm) |
|---|---|---|---|---|---|---|---|
| 11B | Gypsum | 350 | 3.37 | 945 | 9.11 | wet | 0.0054 |
| 6B | Stucco | 350 | 3.36 | 1000 | 9.60 | ideal agglomerate | 0.00367 |

The present disclosure therefore provides, among other things, methods for making an agglomerate of an ore, ore agglomerates, and methods for producing soluble phosphate. Various features and advantages of these methods and compositions are set forth in the following claims.

What is claimed is:

1. A method for making an agglomerate of an ore comprising mixing the ore with a binder composition comprising calcium sulfate hemihydrate to make a dry mixture, and then contacting the dry mixture with an acid solution to make the agglomerate.

2. The method of claim 1, wherein the acid solution comprises at least one of sulfuric acid, hydrochloric acid, and nitric acid.

3. The method of claim 1, wherein the binder composition further comprises a modifier.

4. The method of claim 3, wherein the modifier includes at least one of a binder, a fiber and a thickener.

5. The method of claim 4, wherein the binder comprises at least one of lignin, cellulose, tall oil, polymers, and sodium silicate.

6. The method of claim 4, wherein the fiber comprises at least one of glass fibers and plastic fibers.

7. The method of claim 4, wherein the thickener comprises at least one of carboxymethylcellulose, a carboxymethylcellulose salt, carboxyethylcellulose and a carboxyethylcellulose salt.

8. The method of claim 1, further comprising contacting the ore, the acid solution, and the binder composition with an acidophilic bacteria.

9. The method of claim 1, wherein the acid solution forms between about 2% and about 15% (w/w) of the agglomerate.

10. The method of claim 9, wherein the acid solution forms between about 7% and about 10% (w/w) of the agglomerate.

11. The method of claim 1, wherein the acid solution comprises between about 10% and about 90% (w/w) acid.

12. The method of claim 11, wherein the acid solution comprises between about 15% and about 25% (w/w) acid.

13. The method of claim 1, wherein the binder composition forms between about 1% and about 10% (w/w) of the agglomerate.

14. The method of claim 13, wherein the binder composition forms between about 3% and about 5% (w/w) of the agglomerate.

15. The method of claim 1, wherein the ore comprises at least one of copper, nickel, uranium, zinc, and phosphate.

16. The method of claim 1, wherein the mixing step comprises mixing in a rotating drum mixer.

\* \* \* \* \*